United States Patent

[11] 3,593,095

[72] Inventor Sidney Davis
 East Norwich, N.Y.
[21] Appl. No. 786,905
[22] Filed Dec. 26, 1968
[45] Patented July 13, 1971
[73] Assignee Vernitron Corporation
 New York, N.Y.

[54] SYSTEM TO COMPENSATE FOR THE NONLINEARITY OF A SELF-SYNCHRONOUS TORQUE TRANSMITTER
2 Claims, 1 Drawing Fig.
[52] U.S. Cl........................................................ 318/692,
 318/632, 318/654
[51] Int. Cl....................................................G05b 11/12,
 G05d 23/275
[50] Field of Search........................................... 318/24, 30,
 20.705, 20.735, 20.725, 20.890, 20.420, 20.530

[56] References Cited
UNITED STATES PATENTS
3,068,385 12/1962 Galbraith ..................... 318/24
3,179,864 4/1965 Kramer ....................318/(20.530 X)
3,209,223 9/1965 Scheib, Jr. .................. 318/(20.420)

Primary Examiner—T. E. Lynch
Attorney—Edward H. Loveman

ABSTRACT: The invention is concerned with a conventional servosystem which in response to an input electrical signal produces a torque output via a mechanical feedback shaft which drives a synchro torque transmitter. A feedback transducer responsive to the electrical output signal of the torque transmitter and to its torque input (actually the torque output of the servomechanism) produces an electrical feedback signal for continually compensating the system for inaccuracy in the torque transmitter and for capacitance losses resulting from lengthy output leads of the torque transmitter.

PATENTED JUL 13 1971
3,593,095
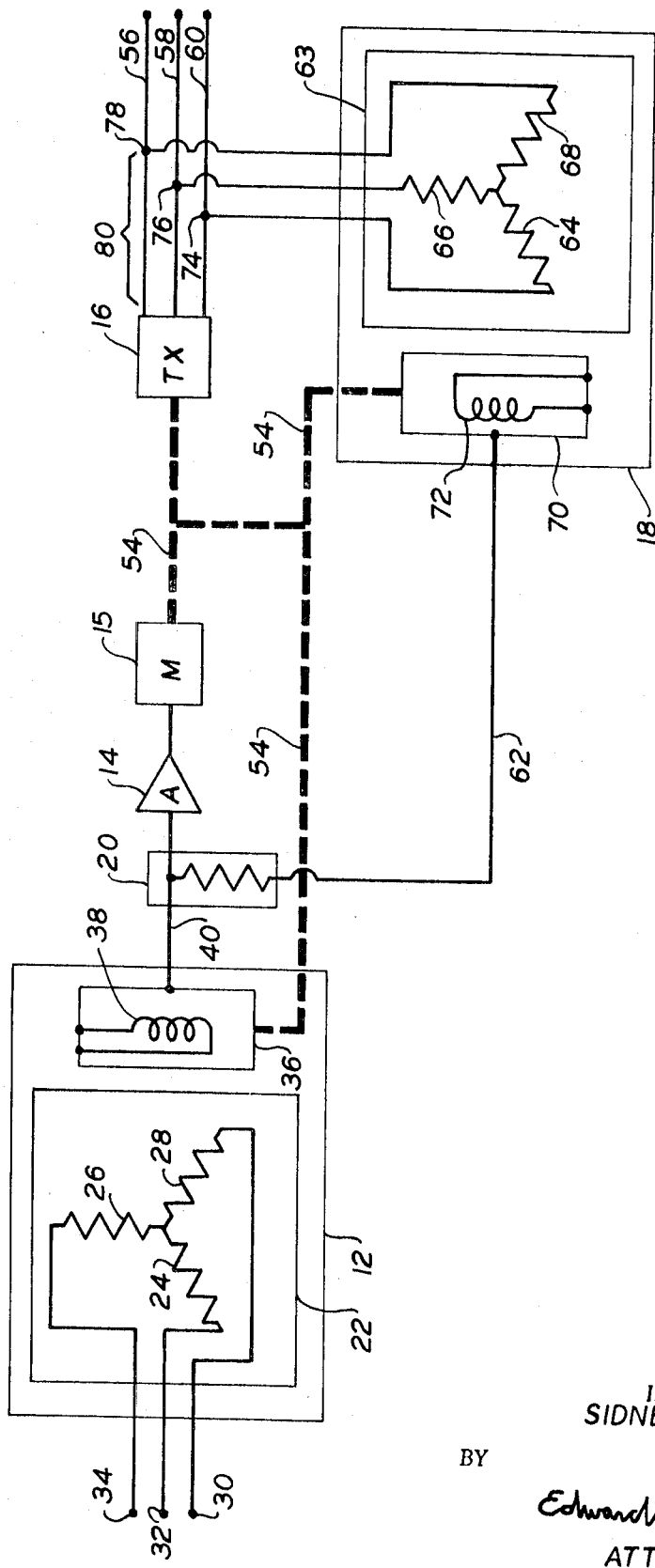
INVENTOR.
SIDNEY DAVIS
BY
Edward H Loveman
ATTORNEY

SYSTEM TO COMPENSATE FOR THE NONLINEARITY OF A SELF-SYNCHRONOUS TORQUE TRANSMITTER

This invention relates to servosystems and more particularly to a servosystem including electrical feedback means for compensating for inaccuracies in the components thereof and, in addition, for compensating for losses which may occur along the length of lines thereof.

A conventional angular positioning servomechanism such as that disclosed in U.S. Pat. application, Ser. No. 610,921, filed Jan. 23, 1967, in the name of Faik K. Ibrahim and Sven B. Braaten may include a synchro control transformer which produces an electrical signal as an output of its rotor thereof in response to the nonalignment of the rotor with respect to an input electrical signal from a transmitting synchro. This electrical signal is applied to an amplifier and a motor which produces a torque output in accordance with the magnitude of the aforementioned electrical signal. A mechanical feedback arrangement is provided between the motor of the servomechanism and the rotor of the control transformer synchro to drive the rotor back until the electrical input signal drops to zero whereby the motor stops and the angular position of the motor shaft has been displaced in accordance with the input electrical signal. In many applications of this type of system, the torque output of the servomechanism is additionally applied to a torque transmitter which reconverts the mechanical torque to an electrical output signal which is carried on electrical lines to some further stage in the overall system.

When utilizing a torque transmitter in the system described above, two significant problems have arisen. First, it is unfortunate fact that such torque transmitters are not as accurate as the control transformer. As a result, the electrical output of the torque transmitter can materially differ from the input signal of the control transformer or receiving synchro. A second problem becomes acute when the electrical output lines of the torque transmitter are exceptionally long and, therefore, capacitive losses along the length thereof may be significant. Thus, at a relatively remote point from the torque transmitter, the magnitude of the electrical signal will not correspond to the magnitude in the electrical output signal immediately adjacent the torque transmitter.

These two problems have continually plagued circuit designers and until the present invention, none has been able to devise a simple, inexpensive and reliable system for compensating for these errors.

The instant invention provides a simple, inexpensive system for eliminating the above-noted problems. Specifically, and as will be described in greater detail, the instant invention adds to the above-described system, a feedback transducer (preferably a control transformer) which is electrically responsive to the aforementioned electrical output signal of the torque transmitter and mechanically responsive to its input torque to generate an electrical feedback signal representative of the inaccuracy inherent in the torque transmitter. In this manner, the electrical feedback signal functions to correct the entire system in accordance with the magnitude of the aforementioned error signal.

As a particular advantageous feature of the instant invention, and in the situation where the output lines of the torque transmitter are of substantial length, the electrical output signal from the torque transmitter which is fed to the feedback transducer is taken from a point relatively remote from the torque transmitter itself. In this manner, the aforementioned error signal, in addition to correcting the system for inaccuracy in the torque transmitter, will also inherently correct the system for inaccuracy in the electrical output signal which is due to capacitive losses along the length of the output lines of the torque transmitter.

Accordingly, it is an object of the instant invention to provide a servosystem which includes a torque transmitter as an output thereof and which further includes feedback means for compensating for inaccuracy in the torque transmitter.

Another object of the instant invention is to provide such a servosystem which includes the aforementioned feedback means wherein the electrical output of the torque transmitter thereof is carried on lines of substantial length and wherein the electrical signal which is fed to the feedback means is taken from a point relatively remote from the torque transmitter whereby inaccuracies in the magnitude of the electrical output signal of the system which are due to the length of the lines thereof will be inherently compensated for.

These and other objects and many of the intended advantages of this invention will readily be appreciated as the same becomes better understood by reference to the following detailed description when considered in connection with the accompanying drawings; wherein the sole FIGURE illustrates a schematic circuit diagram of a servosystem constructed in accordance with the teachings of the instant invention.

Turning now to the FIGURE, there is illustrated a servosystem 10 which includes a receiving synchro 12; a servoamplifier 14, a servomotor 15; a torque transmitter 16; a feedback transducer 18; and a summing network 20.

The receiving synchro 12 is preferably a control transformer and as such includes a three-phase stator 22 comprising the winding 24, 26 and 28 which receive input signals on the lines 30, 32 and 34 respectively. As well known in the art, the synchro 12 also includes a rotor 36 including a winding schematically indicated at 38 which has an output on a conductor 40.

Synchro receiver 12 may be part of a transmitter-receiver combination (the transmitter not being shown) whereby any misalignment of the rotor 36 with respect to the rotor of the transmitting synchro will produce a signal on the input lines 30, 32 and 34 respectively which in turn will produce an output on the conductor 40.

Disregarding for a moment the presence of a summing network 20, the electrical signal on the conductor 40 is applied to the amplifier 14 and the servomotor 15 for producing a torque output on a shaft 54 in accordance with the magnitude of the electrical signal applied to the amplifier 14. Conventional mechanical feedback means are provided by coupling the output shaft 54 to the rotor 36 of the receiving synchro 12.

Operation of the system thus far may be understood as follows: Should the rotor of the transmitting synchro (not shown) become misaligned with respect to the rotor 36, it will result in a magnetic field unbalance in the transmitting synchro stator (not shown) which will produce an input signal on the lines 30, 32 and 34 which in turn will produce an electrical signal on conductor 40. This electrical signal is amplified at 14 and applied to the motor 15 which will develop the output torque on the shaft 54. The mechanical feedback generated by shaft 54 will then rotate the rotor 36 to realign the rotor 36 with respect to the rotor of the transmitting synchro. When the rotors are realigned, the electrical signal on conductor 40 will be reduced to zero and the motor 15 will stop.

As noted previously, the system thus far defined is frequently applied to a torque transmitter such as illustrated at 16 which reconverts the torque applied by way of shaft 54 to an electrical output signal appearing on the lines 56, 58 and 60. However, because torque transmitters are not nearly as accurate as the control transformer which functions as the synchro receiver 12, the output on lines 56, 58 and 60 can sometimes vary substantially from the input applied at 30, 32 and 34. Accordingly, the instant invention employs an electrical feedback system which generates an error signal on the line 62 which error signal is representative of the inaccuracy in the system. Specifically, a feedback transducer 18, preferably comprising a control transformer substantially the same as the synchro receiver 12, includes a stator 63 comprising the three-phase coils 64, 66 and 68 and a rotor 70 including a winding 72.

In operation, the electrical output signal appearing on the lines 56, 58 and 60 is applied to the stator 63 while the torque input signal to the transmitter 16 (actually the output torque generated by the servomechanism) is applied via shaft 54 to the rotor 70 of the transducer 18. The magnitude of the current induced in the coil 72 will thereby be proportional to the difference between the output of the torque transmitter 16 and the signal received by the stator 63. Thus, the transducer output signal appearing on line 62 will represent an error signal which is applied to the summing network 20 to correct the electrical signal applied to the amplifier 14 in accordance with the inaccuracy of the torque transmitter 16.

As a particularly advantageous feature of the instant invention, it will be appreciated that in the event that the lines 56, 58 and 60 are of substantial length, capacitive losses along these lines may substantially reduce the magnitude of the signals carried thereby. To compensate for these losses, the instant invention proposes to establish the takeoff point 74, 76 and 78 at a relatively remote point from the torque transmitter 16 as represented schematically by the distance 80. In this manner, the electrical feedback system including the feedback transducer 18 will not only compensate for the inaccuracy in the transmitter 16, but also for the inaccuracies generated as a result of the length of the line 56, 58 and 60.

Although this invention has been described with respect to its preferred embodiment, it should be understood that many variations and modifications will now be obvious to those skilled in the art, and it is preferred, therefore, that the scope of the invention be limited, not by the specific disclosure herein, but only by the appended claims.

It should be understood that the foregoing disclosure relates to only a preferred embodiment of the invention and that it is intended to cover all changes and modifications of the example of the invention herein chosen for the purposes of the disclosure which do not constitute departures from the spirit and scope of the invention.

The invention I claim is:

1. In a servosystem of the type wherein an electrical signal from a control transformer is applied to an amplifier which drives a motor having an output shaft coupled to both a torque transmitter and the rotor of said control transformer and wherein said torque transmitter is relatively inaccurate as compared to said control transformer, the improvement comprising, a second control transformer mechanically coupled to said output shaft and responsive to an electrical output signal from said torque transmitter for producing an electrical feedback signal representing the difference therebetween, and summing means for combining said feedback signal and said electrical signal and applying said combined signal to said amplifier, whereby the inaccuracy of said torque transmitter is corrected.

2. The servosystem as recited in claim 1 wherein said electrical output signal is carried by lines of substantial length, and is fed to said second control transformer from a point relatively remote from said torque transmitter.